(12) United States Patent
Sery

(10) Patent No.: US 6,948,781 B2
(45) Date of Patent: Sep. 27, 2005

(54) BALANCE WEIGHT ASSEMBLY

(76) Inventor: Joseph Sery, 4280 Calle Mar de Ballenas, San Diego, CA (US) 92130

( * ) Notice: Subject to any disclaimer, the term of this patent is extended or adjusted under 35 U.S.C. 154(b) by 31 days.

(21) Appl. No.: 10/600,579

(22) Filed: Jun. 23, 2003

(65) Prior Publication Data
US 2004/0256909 A1 Dec. 23, 2004

(51) Int. Cl.$^7$ ................................................ B60B 1/00
(52) U.S. Cl. ..................... 301/5.21; 301/5.22
(58) Field of Search ............... 301/5.21, 5.22, 301/37.108; 74/573 R

(56) References Cited

U.S. PATENT DOCUMENTS

| | | | | |
|---|---|---|---|---|
| 1,833,879 A | * | 11/1931 | Ash ........................... | 301/5.21 |
| RE18,578 E | * | 8/1932 | Couture ...................... | 301/5.21 |
| 1,889,577 A | * | 11/1932 | Tibbetts ....................... | 301/5.21 |
| 1,997,825 A | * | 4/1935 | Hume ........................ | 301/5.21 |
| 2,029,561 A | * | 2/1936 | Du Sang ................... | 301/5.21 |
| 2,036,757 A | * | 4/1936 | Hume ........................ | 301/5.21 |
| 2,697,345 A | * | 12/1954 | Currier ........................ | 73/487 |
| 2,950,142 A | * | 8/1960 | Lyon .......................... | 301/5.21 |
| 2,964,356 A | * | 12/1960 | Lyon ....................... | 301/37.34 |
| 3,280,637 A | * | 10/1966 | Ealey et al. ................. | 73/457 |
| 3,462,197 A | * | 8/1969 | Bajer ........................ | 301/5.21 |
| 4,358,148 A | * | 11/1982 | Kirschner ...................... | 295/7 |
| 4,379,596 A | * | 4/1983 | Green et al. ................ | 301/5.21 |
| 4,720,149 A | * | 1/1988 | Thissen et al. ............. | 301/5.21 |
| 4,754,791 A | * | 7/1988 | Flebbe ....................... | 301/5.21 |
| 5,228,754 A | * | 7/1993 | Rogers ...................... | 301/5.21 |
| 5,350,220 A | * | 9/1994 | Atwell, Jr. .................. | 301/5.21 |
| 5,733,016 A | * | 3/1998 | Brown ....................... | 301/5.21 |
| 5,817,418 A | * | 10/1998 | Goto et al. .................. | 428/408 |
| 5,931,543 A | * | 8/1999 | Smith ....................... | 301/37.28 |
| 6,238,006 B1 | * | 5/2001 | Manojlovic ................. | 301/5.21 |
| 6,250,721 B1 | * | 6/2001 | Oba et al. .................. | 301/5.21 |
| 6,364,422 B1 | * | 4/2002 | Sakaki et al. .............. | 301/5.21 |
| 6,676,224 B2 | * | 1/2004 | Kogure et al. ............. | 301/5.21 |

* cited by examiner

Primary Examiner—Russell D. Stormer
Assistant Examiner—Jason R. Bellinger

(57) ABSTRACT

The present invention relates to a balance weight assembly for a vehicle wheel, including a portion designed to attach and fix the balance weight to the flange edge of a wheel rim and a portion designed to retain a weight made from a high-density material, such as tungsten rod.

19 Claims, 4 Drawing Sheets

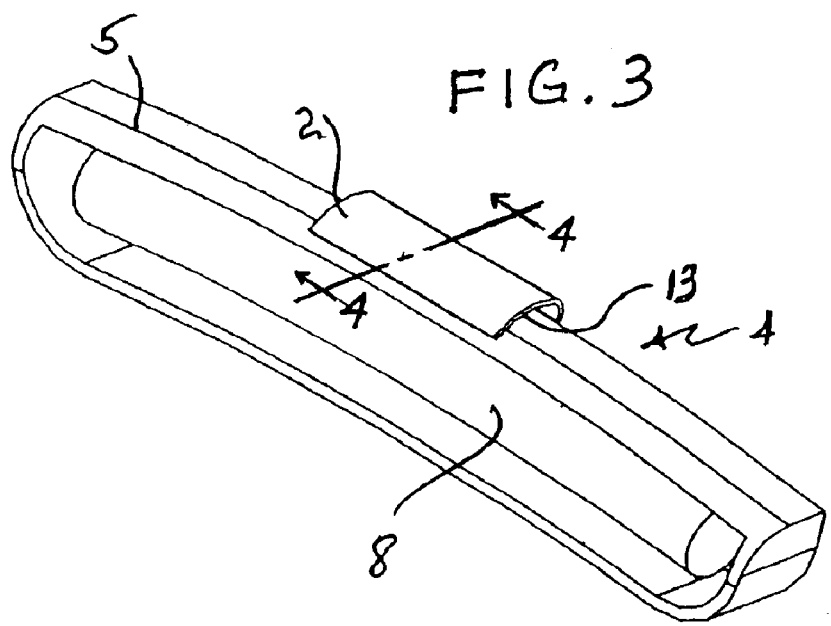
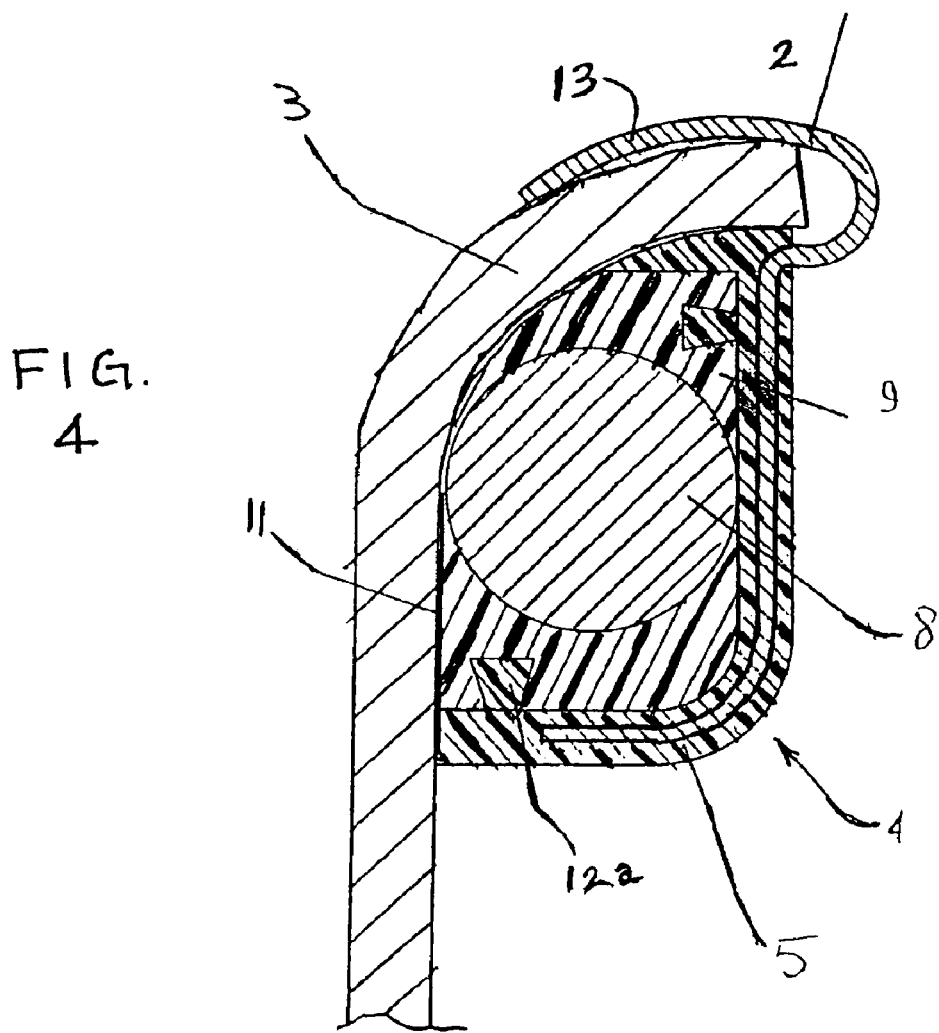

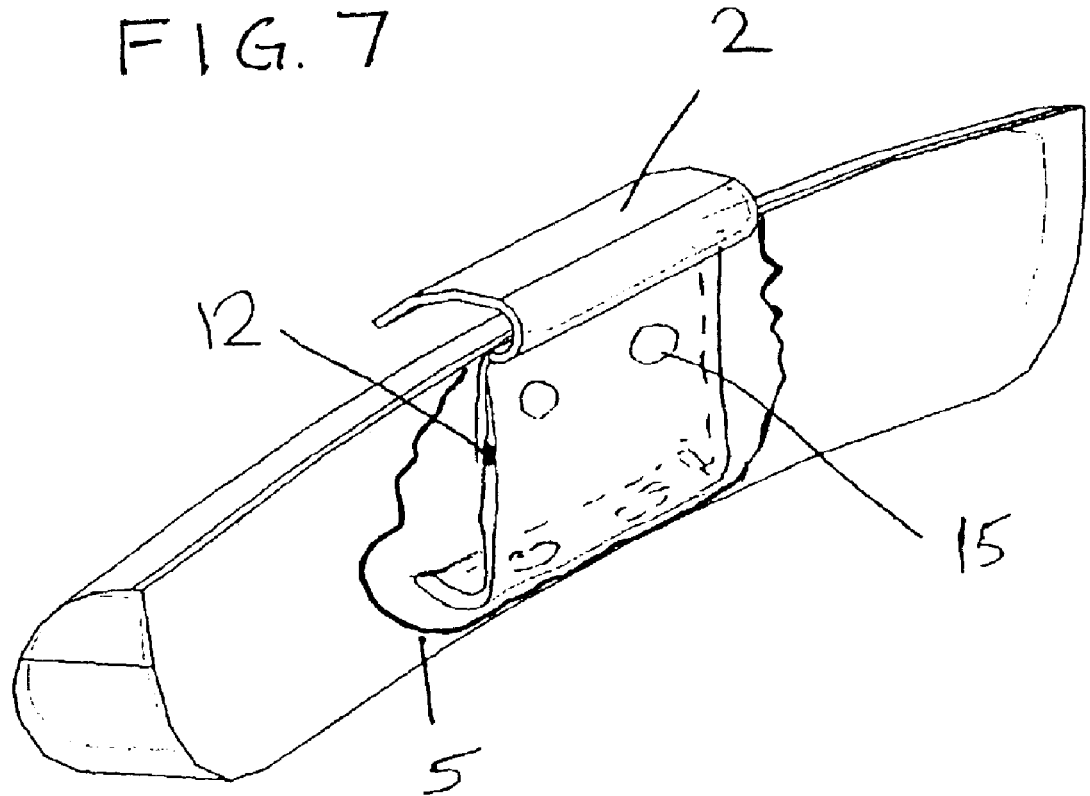

BALANCE WEIGHT ASSEMBLY

FIELD OF INVENTION

The present invention pertains generally to a lead-free balance weight which is used to rotary balance a vehicle wheel for an automobile or the like.

BACKGROUND OF THE INVENTION

The present invention relates to a lead-free balance weight, which is used to rotary balance a vehicle wheel of an automobile, motorcycle, truck or the like. Whilst in motion, an unbalanced rotating tire can cause vibration. This vibration is transferred through the steering mechanism to the driver, thus creating an uncomfortable driving condition. Further, such vibrations have an adverse effect on the performances of the automobile, such as excessive tire wear. Accordingly, it is very important to control the wheel balance. Present balance weights are made of lead and come in a variety of sizes so as to allow a desired weight to be positioned in the desired location of the wheel rim in order to obtain the correct balance.

Because, it is recognized that lead is toxic to the human body, it is undesirable to use lead from an environmental point of view. Some toxicity of the balance weight can be transferred to a city water system when such falls off the wheel and finds its way into the water drainage system along a road and eventually into a municipality's water supply.

It has been suggested to use balance weights made of iron in place of the present balance weights made of lead, see for example, U.S. Pat. No. 6,250,721. However, such balance weights made of iron have a drawback that their volume must increase by about 44% to provide a balance weight having the same weight because the specific gravity (7.86 g/cc) of iron is considerably smaller than the specific gravity (9–11 g/cc) of the common lead alloys. Moreover, whereas a wheel balance weight made of a lead alloy can be easily deformed, it is very difficult to appropriately change the shape of the balance weight made of iron at the time of attachment because iron is very hard. Accordingly, there arises a problem that such an iron balance weight cannot be properly positioned along the contour of the wheel as is desired.

U.S. Pat. No. 6,364,422 (Apr. 2, 2002), entitled Balance Weight for Vehicle Wheel, discloses and claims a balance weight for a vehicle wheel which utilizes a metal clip that includes a hook portion shaped to correspond to the edge of a wheel flange and a leg portion onto which is molded a body of tungsten powder dispersed in a styrene-based copolymer. Although this balance weight system does avoid the use of lead, it is generally necessary for the polymer to constitute about 40 volume percent of the wheel weight, and it requires a reasonably sophisticated injection molding process for manufacturing. Other metal clips for attaching wheel weights are shown in U.S. Pat. Nos. 5,733,016 and 5,228,754. Whereas ideally, the manufacture of a balance weight from molten tungsten might be preferred, tungsten cannot be reasonably melted and forged. As a result, it is generally necessary to provide high density tungsten bodies through a pressing and sintering process. Accordingly, it is not possible to manufacture balance weights in the manner done heretofore for making lead weights by pouring the molten material over a pre-formed clip. Accordingly, alternative manufacturing methods have been sought to provide a cost effective manner of utilizing a high density tungsten for a vehicle balance weight.

SUMMARY OF THE INVENTION

An object of the present invention is to provide a balance weight for a vehicle wheel, which can be securely attached to the wheel, is relatively small in size and attractive in appearance, and yet does not include lead. Another object of the present invention is to provide a non-lead balance weight for vehicle wheel, which can be fixed and removed from the vehicle wheel with the same tools and procedures currently in use by wheel balancing mechanics. Yet another object of the present invention is to provide a non-lead balance weight for vehicle wheel, which is easy to use and comparatively cost effective.

In one particular aspect, the invention provides a balance weight assembly for a vehicle wheel, which assembly comprises a body including a hook portion having a cross-sectional shape corresponding to a flange edge portion of a vehicle wheel rim and a cavity for holding a separate high-density weight which is secured in the cavity by fill material having adhesive properties.

In another particular aspect, the invention provides a balance weight assembly for attachment to a flange edge portion of a vehicle wheel rim, which assembly comprises a one-piece molded polymeric component comprising a clip portion having a cross-sectional shape corresponding to a flange edge portion of a wheel rim, and a hollow body portion, proportioned to contain a high-density weight which can be secured therewithin to prevent inadvertent separation.

BRIEF DESCRIPTION OF THE DRAWINGS

FIG. 3 is a perspective view of the wheel weight assembly of FIG. 2 in its assembled condition.

FIG. 4 is a cross sectional view, enlarged in size, taken along the line 4—4 of FIG. 3 showing the wheel weight assembly on a vehicle wheel rim.

FIG. 7 is a perspective view of the wheel weight assembly of FIG. 3 taken from a different angle and broken away to show the metal clip molded therewithin.

DETAILED DESCRIPTION OF THE PREFERRED EMBODIMENTS

Figure 1:
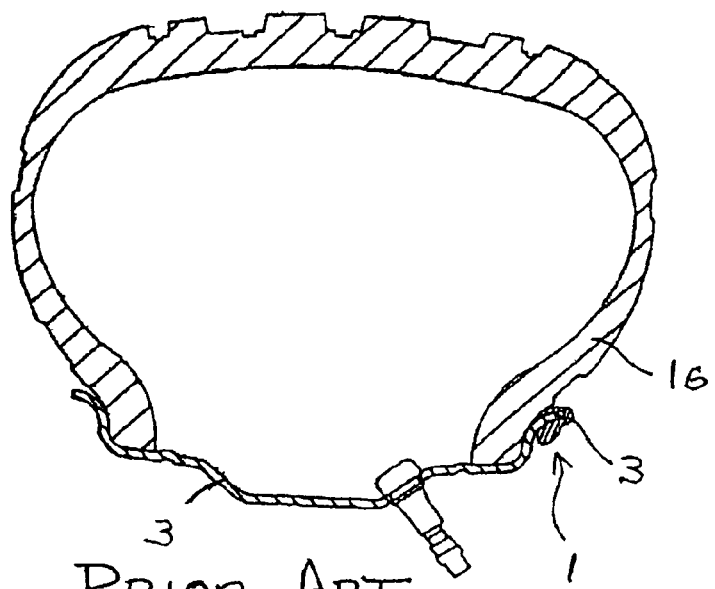
FIG. 1 is a cross section of a typical automobile wheel showing its assembly with a balance weight of the prior art.

FIG. 1 shows a prior art balance weight 1 attached to a wheel rim 3 on which an inflated tire 16 is supported. The balance weight 1 includes an injection-molded body that is manufactured using a metal spring clip inserted in the mold.

FIGS. 2–4 and 7 show a balance weight assembly 4 that includes a body 5 for holding a high-density weight 8 and that includes a metal clip 2. The body 5 is shaped provide an elongated hollow cavity portion or pocket, having an inner surface 6 and an outer wall 7. The inner wall surface defines the radial segment-shaped cavity that is proportioned to contain the high-density weight 8. In this embodiment, the body 5 is preferably injection-molded from a suitable polymer, such as a polypropylene, so as to bond securely metal clip 2 portion to the of balance weight assembly 4. The clip 2 is usually of a spring type design and comprises a hook portion 13 formed corresponding to the shape and proportion of the flange edge portion of a vehicle wheel rim 3, particularly to the thickness of the flange edge portion. Clips of the designs shown in the previously mentioned U.S. patents, the disclosures of which are incorporated herein by reference, may generally be used. The hook portion 13 serves to attach and fix the assembly 4 on the flange edge portion of the wheel rim 3.

The main body portion of the clip includes a leg portion 12 (see FIG. 7) that is designed to provide good retention within the molded body, retaining and holding the body permanently in position. This leg portion 12 of the clip 2 is positioned between the outer 7 and the inner 6 walls surfaces of the body 5, but it may preferably be located closer to the surface of the inner wall 6. When the assembly is mounted on the flange edge portion of a wheel rim 3, the leg portion 12 of the clip lies close to and parallel to the surface of the high-density weight 8, further adding strength to the assembly 4. The gap between the hook portion and the remainder of the clip 2 is formed to correspond to the rim 3 thickness. In this illustrated embodiment, the hook 13 portion of the clip 2 is located in the longitudinal center of the elongated radial segment body 5, similar to the usual lead balance weight.

Preferably, the high-density weight 8, which is positioned inside the cavity of the body 5, is made of tungsten (which may be fully sintered, semi-sintered or un-sintered). The tungsten can also be in form of a high-density tungsten powder (compounded or un-compounded with a polymeric material). It may be a tungsten rod or any tungsten solid shape. For lighter size balance weights, the high-density weight 8 may be a steel or cooper rod or one of some other suitable metal.

Figure 2:
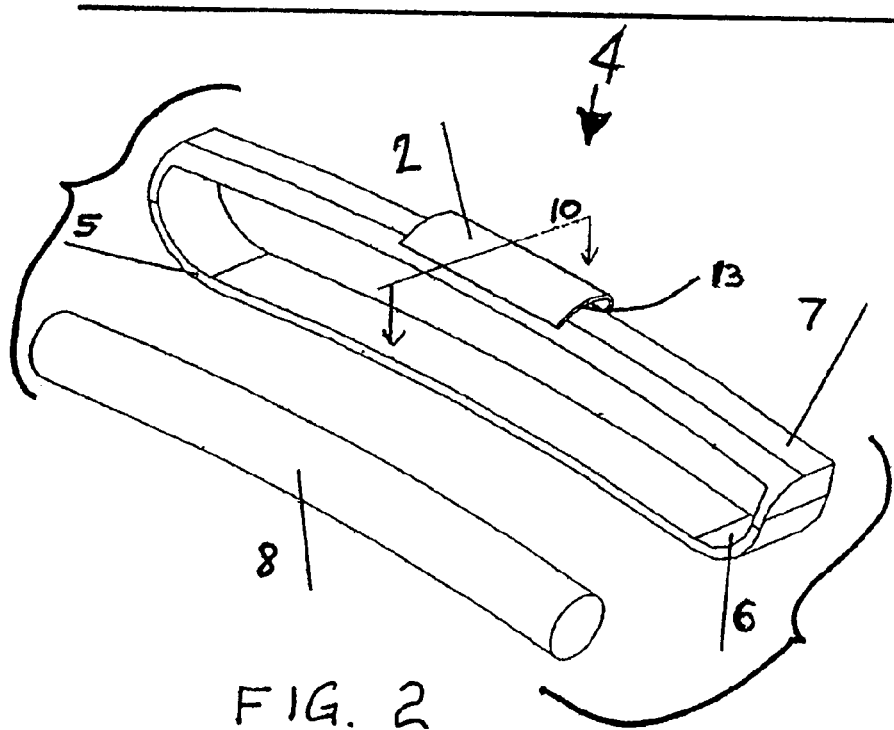
FIG. 2 is an exploded perspective view of a wheel weight assembly embodying various features of the present invention.

Shown in FIG. 2 is a perspective view of the molded body 5 with its protruding clip portion 2. The body 5 is molded as so as to provide a cavity or a pocket that is proportioned to receive an elongated high density weight 8. In this embodiment, the metallic clip 2 is preferably inserted in an injection mold cavity or the like as explained hereinafter with regard to FIG. 7. The preferred weight is that having the shape of a rod 8 of circular cross section, although other shapes may alternatively be employed. FIG. 3 shows a perspective view of the rod 8 disposed in the pocket of the body 5.

FIG. 4 shows a cross-sectional, enlarged view of the weight assembly 4 installed on a wheel run 2. From this view, it can be seen that the inner surface 6 of the body that forms the pocket is preferably made with a pair of protruding retainers 12a that extend longitudinally of the pocket and taper outwardly from the surface 6 having a generally dovetail cross sectional shape. Once the weight 8 is disposed in the pocket, the remainder of the pocket is preferably filled with polymeric material having adhesive properties. Examples of such material include thermosetting polymers, such as epoxy and polyurethane resins, and the so called hot-melt adhesives may also be employed. The filling of the cavity is preferably carried out using a jig or the like so that the resultant body has a curved surface 11 that follows the curvature of the upper exterior surface and extends to a point where it is tangent with the lower vertical section, as shown in FIG. 4. This surface matches closely the flange end region of a standard vehicle wheel rim so that it will lie in close contact with the wheel rim, as can be seen in FIG. 4. The inclusion of the generally dovetail retainers 12a assures that the hardened filler and the weight 8 have now become an integral part of the overall body, which simply could not inadvertently thereafter separated.

FIG. 7 is a perspective view of the FIG. 3 embodiment shown from the opposite face which is broken away so as to expose the metal clip that is molded to become an integral part of body 5 during the injection molding process. The clip of course has a protruding hook portion which extends with a curvature of that of the upper surface of the body and a main section that depends therefrom and may have a plurality of apertures 15 useful to anchor it securely within the hardened polymeric resin. The clip 2 also appears in cross-section in FIG. 4, and such holes can also be used to position the clip in the mold during the injection molding operation.

Figure 6:
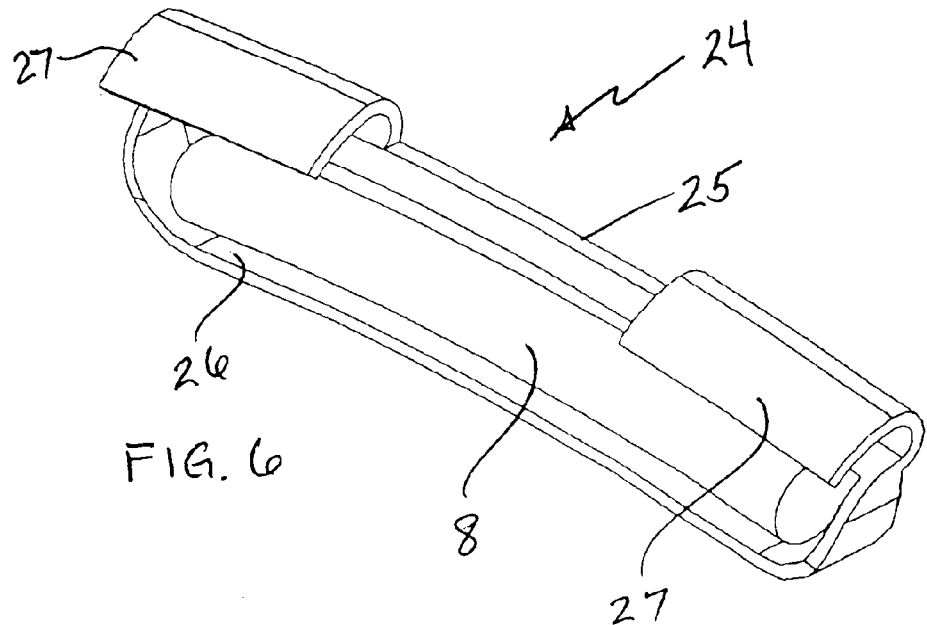
FIG. 6 is an assembled perspective view of yet another wheel weight assembly embodying various features of the present invention.

Shown in FIG. 6 is a perspective view of another embodiment of a balance weight assembly 24 which utilizes a cylindrical rod 8 of high density material, such as sintered tungsten. The assembly includes a body 25 molded entirely of a tough strong polymeric material, such as ABS, which is formed with an interior pocket 26, having essentially the same shape and proportions as that previously described. In this embodiment, however, a pair of clip hooks 27 are integrally molded from the polymeric material so these hook sections are made of the same material as the remainder of the body. The pocket 26 with the weight 8 in place would be filled with polymeric resin as described hereinbefore.

Figure 5:
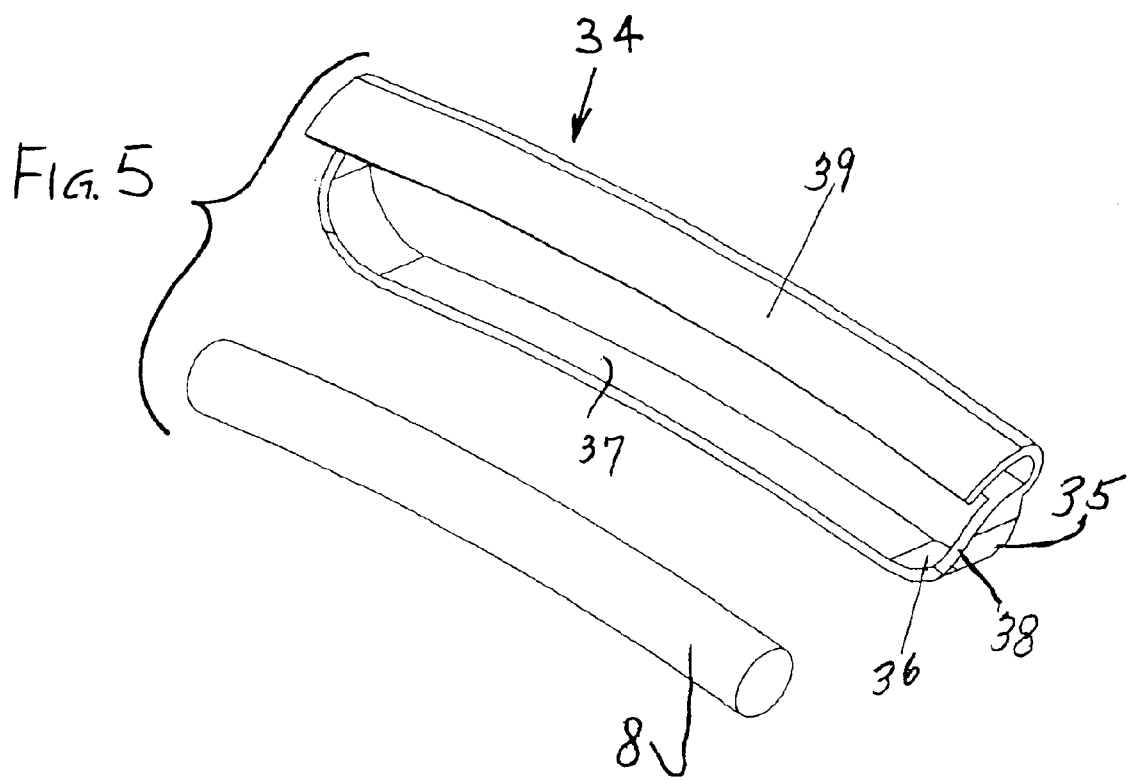
FIG. 5 is a perspective view showing an alternative embodiment of a wheel weight assembly embodying various features of the invention shown in exploded perspective.

FIG. 5 shows another somewhat similar embodiment where a balance weight assembly 34 is shown in exploded perspective. In this embodiment, a body 35 is molded to have a similar pocket 36 that will accommodate a cylindrical weight 8. The pocket is formed with a bottom wall 37 and an end wall 38 and with a single clip hook section 39 that extends for the length of the body. Although not shown, the lower bottom wall 37 and the vertical wall of the pocket are preferably formed with dovetail cross section retainers or the like. Should greater strength be desired, the body 25 can be molded from a high impact acetal resin that may contain suitable fillers, such as fibers.

The assembly provides an excellent fit to the radial shape of the wheel because the body remains slightly flexible even after the high-density weight is inserted into the cavity and secured by the polymeric fill material. The tungsten rod can have a density such as 17 g/cc and higher (which is higher than the 9 g/cc of the lead alloy typically presently used) and this higher density enables the balance weight to remain compact, i.e. small in size, while yet provide the desired overall weight. The ability to use a tungsten rod provides a particularly cost effective way to utilize a standard sintered tungsten material. Such rod can be made in long length and cut to size, rather than pressing and sintering individual solid parts to function on such weights.

The injection molded body component can be made in any color by adding color pigments to the polymeric resin material to allow matching to the color of a wheel rim. Colors such as black, white and aluminum are popular. Further, both the injection molded body which include a spring metal clip and the fully integrated body-clip embodiment 24 and 34 can be made from a material (such as ABS), which is suitable for electroplating, so the wheel balance weight assembly can also be made with a nickel or chrome finish to thus match the finish of a similarly finished wheel rim.

To summarize, a high-density lead free weight 8, such as tungsten, is disposed in a cavity of an elongated body 5 and secured so as to prevent inadvertent separation. The assembly is then fixed to the flange edge of a wheel rim 3 for the purpose of balancing the wheel via the attached clip 2 as with present day balance weights.

The following advantages are accorded of the present invention:
(a) the wheel balance weight is lead-free eliminating any risk of toxicity to the environment and humans,
(b) because tungsten or another such higher density material is used in the construction, the total weight of the wheel balance weight can be increased compared to lead wheel balance weight of comparable size;
(b) because the wheel balance weight assembly has a clip similar to the lead conventional balance weight, it is as easily attached to or removed from the flange edge of a wheel rim.
(c) by coloring and/or chrome-plating the injection molded body-clip assembly, the color of the balance weight can be made to match the color and finish of the wheel, further enhancing the overall appearance and appeal.

While in the foregoing specification a detailed description of specific embodiments of the invention was set forth for the purpose of illustration, it will be understood that many of the details herein given may be varied considerably by those skilled in the art without departing from the spirit and the scope of the invention, which is defined in the claims appended hereto.

What is claimed is:

1. A balance weight assembly for a vehicle wheel, which assembly comprises:
    a body including a metal clip which provides a hook portion having a cross-sectional shape corresponding to a flange edge portion of a vehicle wheel rim and an elongated cavity for holding a separate elongated high-density weight which is secured an the cavity by a fill material having adhesive properties, said metal clip being partially embedded within the body which is formed of polymeric material and said cavity opening toward the vehicle wheel so as to prevent escape of said weight when mounted.

2. The balance weight assembly as recited in claim 1 wherein the cavity-containing body is made of an injection-molded polymeric resin.

3. The balance weight assembly as recited in claim 2 wherein the body is injection-molded about the metallic clip as an insert in the mold used in the process.

4. The balance weight assembly as recited in claim 3 wherein said body has an outer wall surface and an inner wall surface which defines said cavity, and during the injection process, a straight body section of the metallic clip is positioned closer to the surface of the mold that will define the inner wall of the cavity than to the surface of the mold that defines the opposite outer wall surface and wherein the elongated high density weight has a cross-section substantially less than the cross-section of the elongated cavity and the remainder of the cavity is filled with the polymeric fill material so as to substantially envelop the weight.

5. The balance weight assembly as recited in claim 1, wherein the high-density weight is a solid body of tungsten.

6. The balance weight assembly as recited in claim 1, wherein the high-density weight is a body of tungsten powder having an apparent density of not less than 10 g/cc compounded with a binder.

7. The balance weight assembly as recited in claim 1, wherein the high-density weight is a metal rod.

8. A balance weight assembly for attachment about a flange edge portion of a vehicle wheel rim, which assembly comprises:
    a one-piece molded polymeric component comprising a clip portion having a cross-sectional shape corresponding to a flange edge portion of a wheel rim so as to fit about said flange edge to lie in contact with an inner surface of said flange against which a vehicle tire seats, and a hollow body portion, which portion includes a cavity proportioned to accommodate a high-density weight therewithin in a manner such that inadvertent separation would be prevented.

9. The balance weight assembly as recited in claim 8, wherein the body is linearly elongated and the clip portion is present at least at both longitudinal ends of the body.

10. The balance weight assembly as recited in claim 8, wherein the one-piece body and clip is made by injection-molding using a polymer having high creep resistance and/or high impact strength.

11. The balance weight assembly as recited in claim 8, wherein a high-density metal rod weight is secured in said cavity.

12. The balance weight assembly as recited in claim 11, wherein the high-density weight is a solid body of tungsten.

13. The balance weight assembly as recited in claim 8, wherein a high-density weight made of tungsten powder, having an apparent density of not less than 10 g/cc, compounded with a polymeric binder, is secured in said cavity.

14. The balance weight assembly as recited in claim 8, wherein the high-density weight is secured within the cavity by a material having adhesive properties.

15. The balance weight assembly as recited in claim 14, wherein the adhesive material is a hardened polymer which essentially fills the cavity in a region surrounding the weight.

16. The balance weight assembly as recited in claim 15, wherein the cavity has retainers protruding from two surfaces thereof, with the polymeric material surrounding and securely engaging said retainers.

17. The balance weight assembly as recited in claim 8, wherein the molded body is colored-pigmented or electroplated.

18. A balance weight assembly for a vehicle wheel, which assembly comprises:
    a body including a metal clip which provides a hook portion having a cross-sectional shape corresponding to a flange edge portion of a vehicle wheel rim and a cavity for holding a separate high-density weight in the form of a high-density rod, which rod is secured in the cavity by polymeric material having adhesive properties which fills the remainder of the cavity,
    said metal clip being partially embedded within the body which is formed of polymeric material.

19. The balance weight assembly as recited in claim 18, wherein the cavity has at least one retainer protruding from its interior surface about which said polymeric material is securely hardened.

* * * * *